United States Patent [19]

Manera et al.

[11] Patent Number: 6,079,973
[45] Date of Patent: Jun. 27, 2000

[54] APPARATUS FOR MOLDING PLASTIC CAPS

[75] Inventors: David A. Manera, Vineland; Frank Maatje, Richwood; Arnold Zingler, Williamstown; Dan Lakutis, Elmer; Richard A. Lappine, Millville; Don Horner, Monroeville, all of N.J.

[73] Assignee: Comar, Inc., Buena, N.J.

[21] Appl. No.: 09/049,064

[22] Filed: Mar. 27, 1998

[51] Int. Cl.[7] .................................................. B29C 45/44
[52] U.S. Cl. .......................... 425/556; 264/318; 264/334; 425/809; 425/DIG. 58
[58] Field of Search .................................... 425/438, 556, 425/809, DIG. 58; 264/318, 334

[56] References Cited

U.S. PATENT DOCUMENTS

| | | | |
|---|---|---|---|
| 3,730,664 | 5/1973 | Hultgren | 425/338 |
| 4,019,711 | 4/1977 | Altenhof et al. | 249/59 |
| 4,496,302 | 1/1985 | Brown . | |
| 4,592,475 | 6/1986 | Hannon et al. | 215/252 |
| 4,673,158 | 6/1987 | Hannon et al. | 249/144 |
| 4,861,257 | 8/1989 | Siotani | 425/438 |
| 5,383,780 | 1/1995 | McCready | 425/552 |
| 5,421,717 | 6/1995 | Hynds | 425/556 |
| 5,565,223 | 10/1996 | McCready et al. | 425/556 |

*Primary Examiner*—Tim Heitbrink
*Attorney, Agent, or Firm*—Eugene E. Renz, Jr. PC

[57] ABSTRACT

Apparatus for molding plastic caps having inclined tabs integral with the lower edge of the cap skirt and radially inwardly extending ribs integral with the inner surface of the cap skirt. The tabs and ribs are formed by a plurality of blades having recesses on the ends thereof corresponding to the configurations of the tabs and ribs. The blades are mounted on a core and extend into a female mold having a cup-shaped cavity. A linear drive member is mounted on a fixed plate assembly and connected to a ratchet sleeve rotatably mounted on a movable plate assembly. The end of the ratchet sleeve is provided with circumferentially spaced teeth engaging the lower peripheral edge of the cap skirt. Movement of the movable plate assembly relative to the fixed plate assembly causes the ratchet sleeve to rotate to move the molded tabs and ribs away from the recesses of the blades so that the finished cap can be stripped from the apparatus.

5 Claims, 8 Drawing Sheets

6,079,973

APPARATUS FOR MOLDING PLASTIC CAPS

BACKGROUND OF THE INVENTION

Various apparatus have been proposed for molding plastic caps having hold-down lugs or inclined tabs adapted to engage underneath a shoulder on a container, such as a vial, to hold the cap in a closed, sealed position on the container.

Before removing the finished cap from the molding apparatus, it is necessary that the tab forming components of the molding apparatus and the molded cap be reoriented relative to each other so that the cap tabs are free from any obstruction in the mold cavity, whereby the finished cap can be stripped from the mold cavity.

The reorientation of the finished cap and the tab forming components of the molding apparatus relative to each other is usually accomplished by either moving the tab forming components away from the tabs on the finished cap, or rotating the finished cap in a direction away from the tab forming components in the molding apparatus.

The molding apparatus of the present invention is constructed and arranged to rotate the finished cap relative to the tab forming components in the molding apparatus.

SUMMARY OF THE INVENTION

The apparatus of the present invention for molding plastic caps having inclined tabs and radially inwardly extending ribs comprises, essentially, a conventional injection molding core machine having a fixed platen assembly supporting a core and a movable platen assembly carrying a female mold having a cup-shaped cavity. Fixed and movable plate assemblies are positioned between the platen assemblies and the core extends upwardly through the movable and fixed plate assemblies to the female mold. A plurality of vertically extending blades are secured to one of the movable plate assemblies and are slidably mounted in axial grooves provided on the exterior surface of the core. The upper end portion of the blades are provided with recesses having configurations corresponding to the inclined tabs and radially inwardly extending ribs on the plastic cap.

A linear drive member is mounted on one of the fixed plate assemblies and a ratchet sleeve is rotatably mounted on one of the movable plate assemblies and extends upwardly coaxially with the linear drive member. The ratchet sleeve is provided with a pair of axially extending, diametrically disposed offset slots which receive transverse pins connected to the linear drive member. The upper peripheral edge of the ratchet sleeve is provided with a plurality of circumferentially spaced teeth between which the plastic, forming the lower edge of the skirt of the cap, flows during the molding operation.

By this construction and arrangement, when the movable plate assembly carrying the ratchet sleeve moves upwardly, the pin connection between the linear drive member and the ratchet sleeve causes the ratchet sleeve to rotate, whereby the teeth on the end of the ratchet sleeve, engaging the lower edge of the cap skirt, causes the cap to rotate relative to the upper end portions of the blades to thereby move the cap tabs and ribs away from the tab and rib forming recesses prior to stripping the finished cap from the apparatus.

DESCRIPTION OF THE PREFERRED EMBODIMENTS

Figure 1:
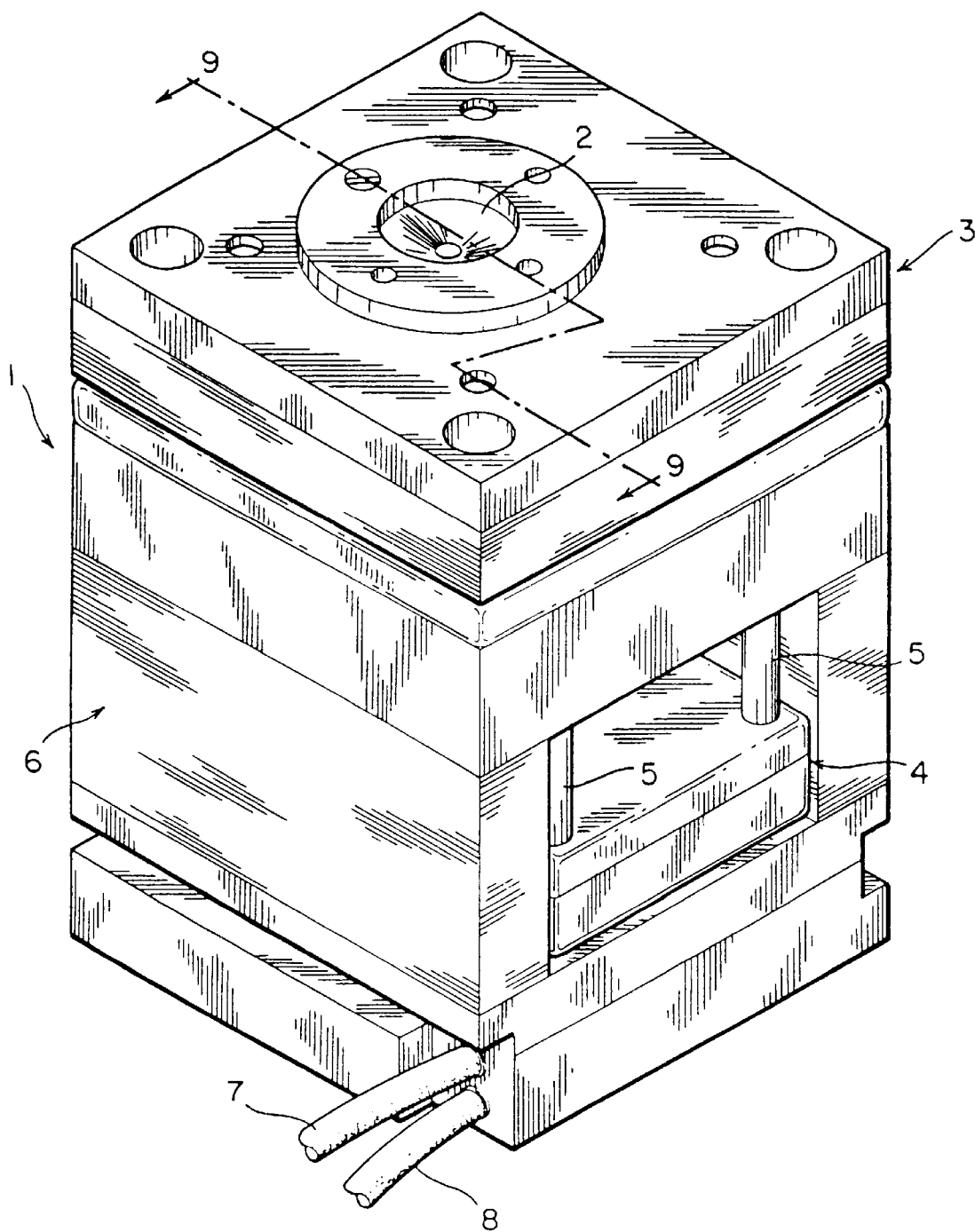
FIG. 1 is a perspective view of the molding apparatus of the present invention.
Figure 2:
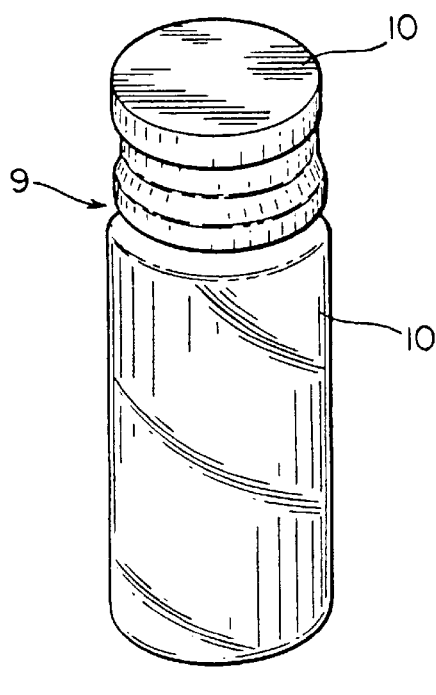
FIG. 2 is a perspective view of a vial having a cap thereon molded by the apparatus of the present invention.
Figure 3:
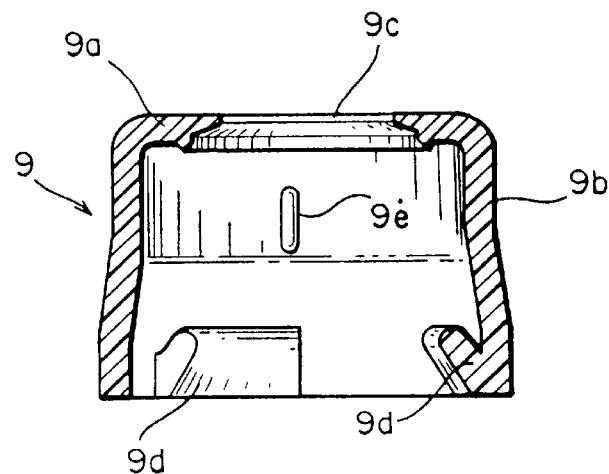
FIG. 3 is a sectional, side elevational view of the cap shown in FIG. 2, without the dust cover.
Figure 4:
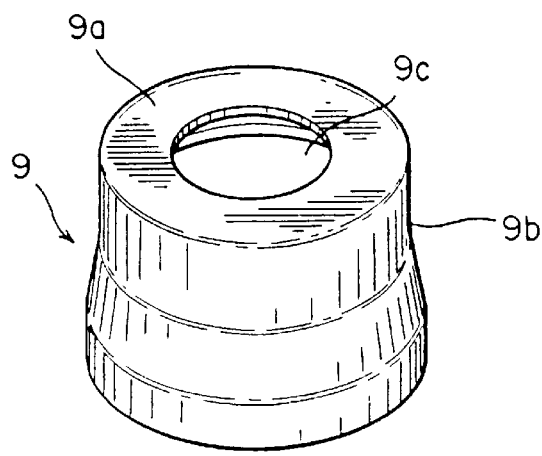
FIG. 4 is a perspective view of the cap shown in FIG. 3.
Figure 5:
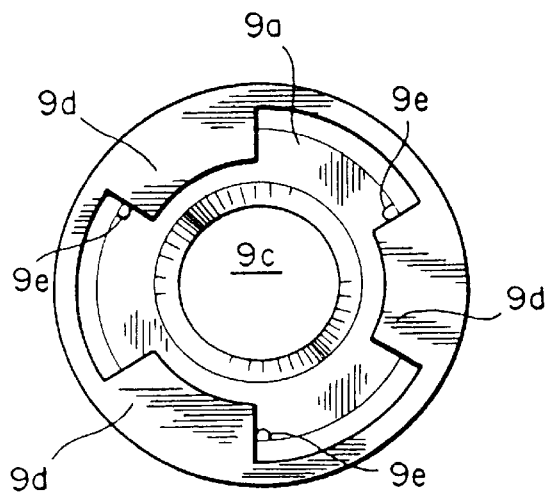
FIG. 5 is a bottom plan view of the cap shown in FIG. 3.
Figure 6:
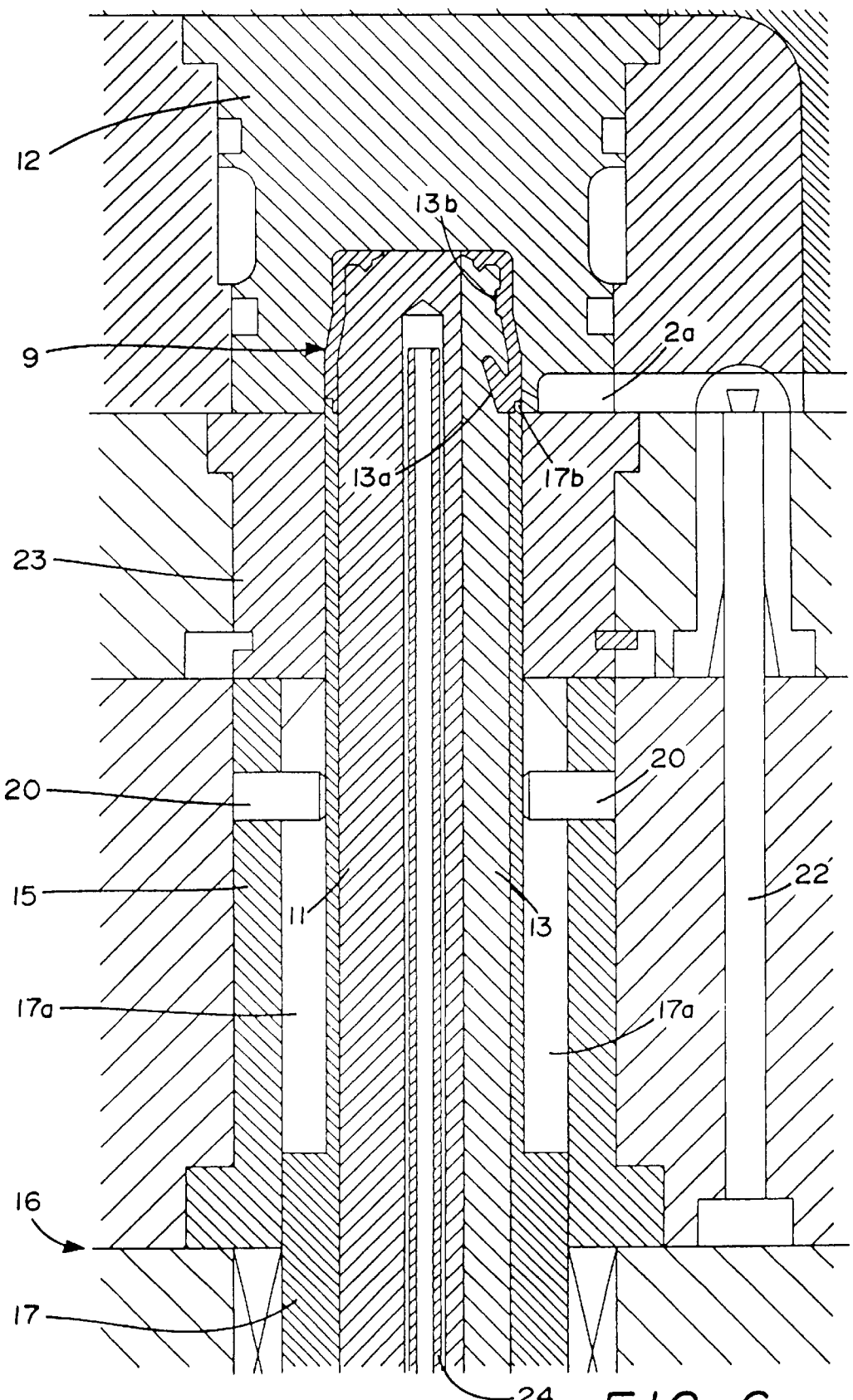
FIG. 6 is an enlarged, fragmentary, side elevational view of the molding apparatus of the present invention in the closed, cap forming position.
Figures 7, 8:
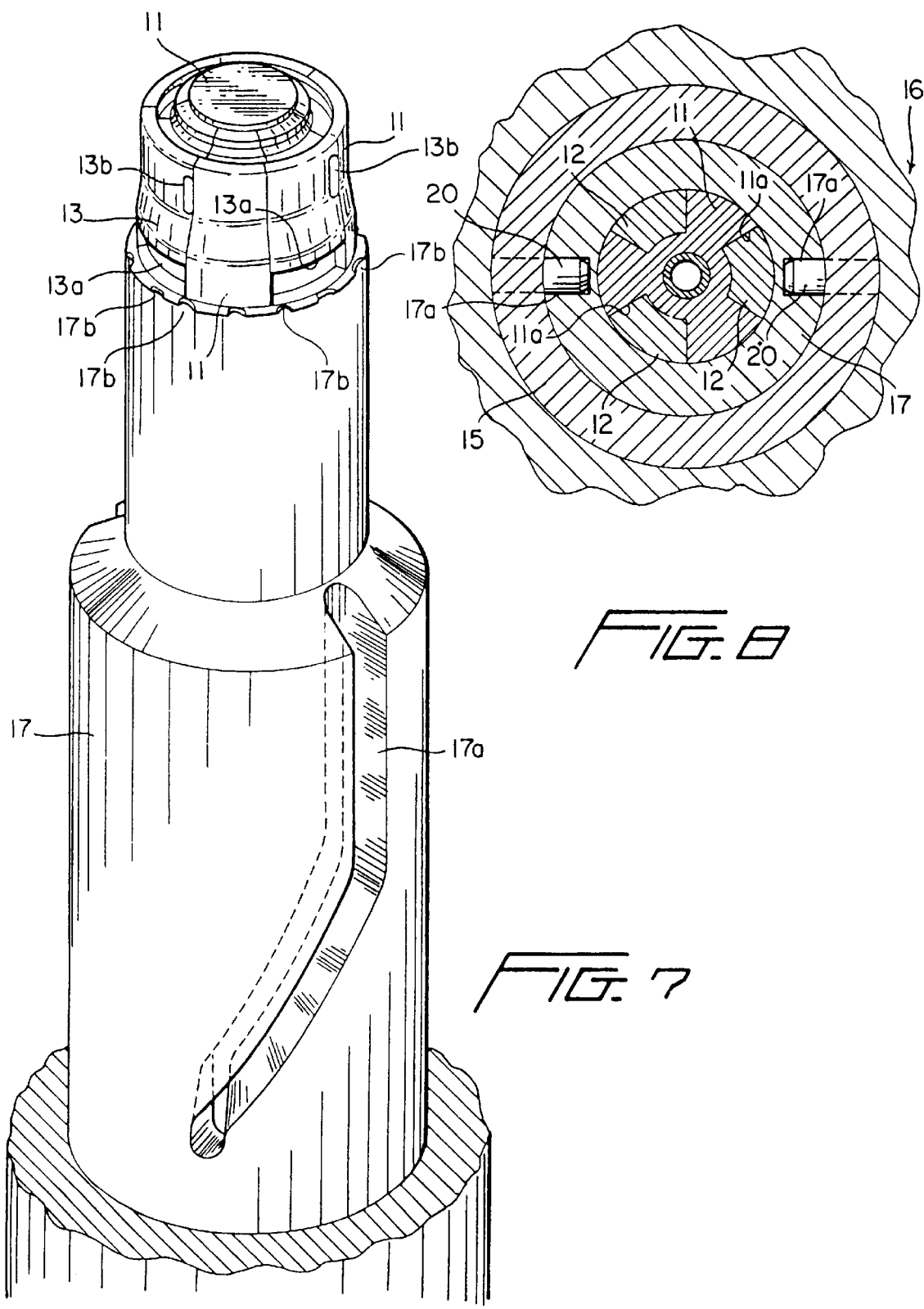
FIG. 7 is a perspective view of the ratchet sleeve and upper end portions of the core and blades employed in the molding machine of the present invention.
FIG. 8 is a view taken along line 8—8 of FIG. 9.

Referring to the drawings and, more particularly to FIG. 1, the molding apparatus 1 of the present invention comprises a conventional single cavity injection molding machine having a spine 2 mounted and vertically movable platen assembly 3 and a fixed platen assembly 4 upon which hydraulic cylinders 5 are mounted. The fixed platen assembly 4 and hydraulic cylinders 5 are provided with a suitable housing 6 into which hoses 7 and 8 extend for the supply and exhaust of hydraulic fluid to the cylinders 5.

The injection molding machine is for molding vial caps 9 shown in FIGS. 2 to 5, and as disclosed in U.S. Pat. No. 5,718,348, issued Feb. 12, 1998, the disclosure of which is incorporated herein by reference. The cap 9 is adapted for sealing a glass vial 10 and is provided with a dust cover 10. The cap has a top wall 9a and a skirt portion 9b depending therefrom. The top wall 9a is provided with an opening 9c for holding the dust cover 10 thereon. The lower end of the skirt portion 9b is provided with a plurality of integral, inwardly, and upwardly extending tabs 9d adapted to engage the bottom surface of a shoulder on the neck of the vial 10 for securing the cap 9 to the vial 10, and a plurality of radially inwardly extending ribs 9e are integral with the inner wall surface of the skirt 9b, the ribs 9e being adapted to be inserted between the teeth of a gear finish on the neck of the vial 10, to thereby prevent the cap 9 from turning when secured to the vial 10.

The details of the construction of the apparatus for molding the cap 9 are illustrated in FIGS. 6 to 9 and comprise a conventional injection molding machine wherein the lower end of a vertically extending core 11 is secured to the fixed platen assembly 4. The upper end portion of the core 11 extends into a female mold 12 having a cup-shaped cavity carried by the movable platen assembly 3. The upper end portion of the core 11 is configured to form the top wall 9a of the cap and the peripheral portions of the cap skirt 9b between the tabs 9d and ribs 9e.

In order to form the cap tabs 9d and ribs 9e, a plurality of axially extending blades 13 are slidably mounted in slots 11a (FIG. 8) provided in the outer surface of the core 11. The lower ends of the blades 13 are secured to a movable plate assembly 14, and the upper end portions of the blades 13 are provided with recesses 13a and 13b having configurations corresponding to the cap tabs 9d and ribs 9e, respectively.

Figure 9:
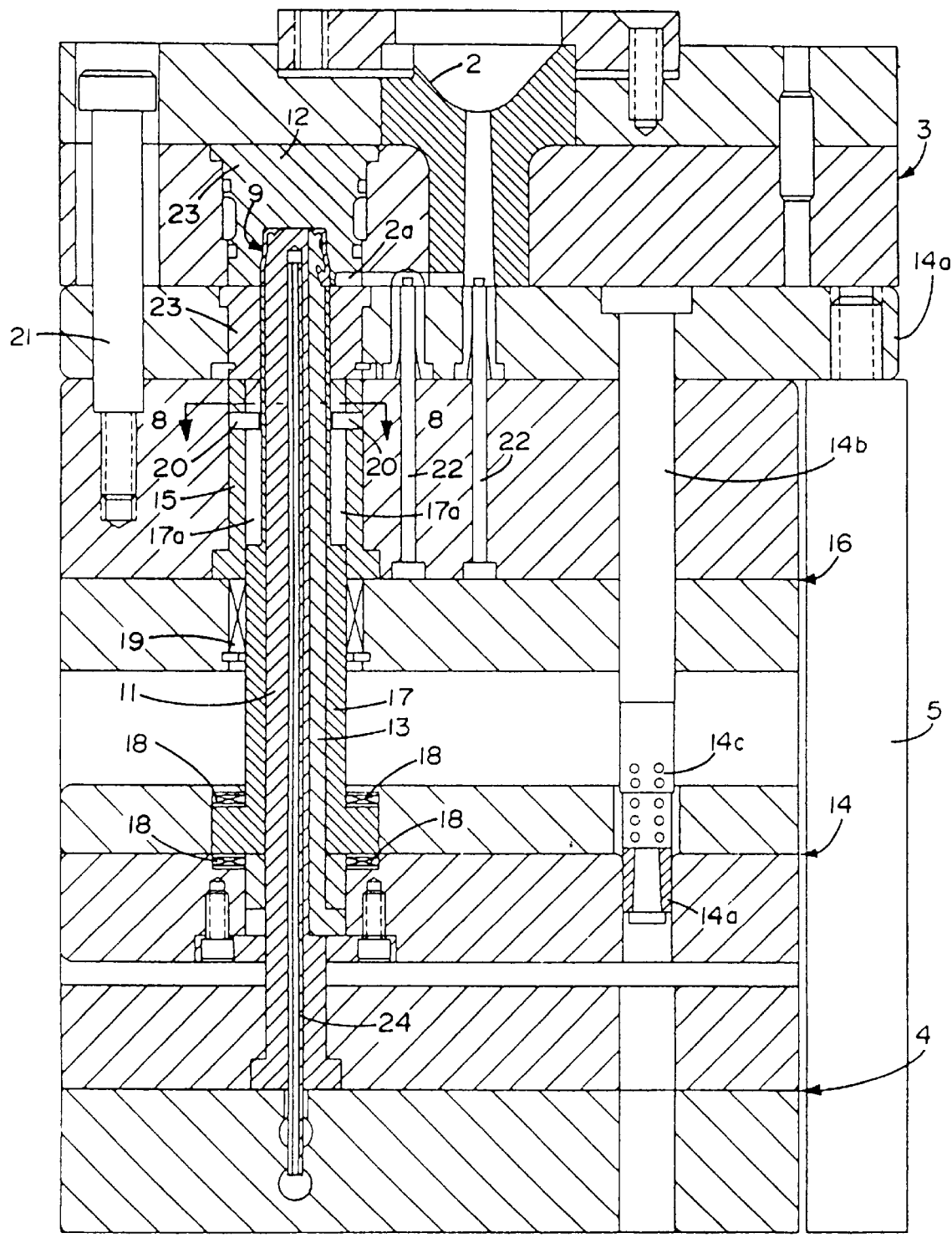
FIG. 9 is a view taken along line 9—9 of FIG. 1.

FIG. 9 shows the injection molding machine in the closed position for molding the cap 9 wherein plastic is injected through the spine 2 through a gate 2a into the cup-shaped cavity of the female mold 12. The upper end portions of the core 11 and blades 13 are spaced slightly radially inwardly from the inner wall of the female mold to provide a clearance into which the plastic flows to form the cap 9.

Before the finished cap 9 can be removed from the mold 12, it has to be reoriented within the mold 12 to move the tabs 9d and ribs 9e out of their respective blade recesses 13a, 13b. To this end, a linear drive member 15 is mounted in a fixed plate assembly 16, and a ratchet sleeve 17 is positioned coaxially within the linear drive member 15 and has its lower end supported on the movable plate assembly 14 and rotatably mounted thereon by suitable bearings 18. The ratchet sleeve 17 extends upwardly through the fixed plate assembly 16 and is rotatably mounted therein by a bearing 19. The ratchet sleeve 17 is provided with a pair of axially extending, diametrically disposed offset slots 17a which receive transverse pins 20 connected to the linear drive member 15. The upper peripheral edge of the ratchet sleeve 17 is provided with a plurality of circumferentially spaced teeth 17b between which the plastic, forming the lower edge of the cap skirt, flows during the molding application.

By this construction and arrangement, when the movable plate assembly 14 carrying the ratchet sleeve 17 is moved upwardly, the pin connection 20 between the linear drive member 15 and the ratchet sleeve 17 causes the ratchet sleeve 17 to rotate, whereby the teeth 17b on the end of the ratchet sleeve 17, engaging the lower edge of the cap skirt, causes the cap 9 to rotate relative to the blades 13, to thereby move the cap tabs 9d and ribs 9e out of their respective recesses 13a, 13b.

Figure 10:
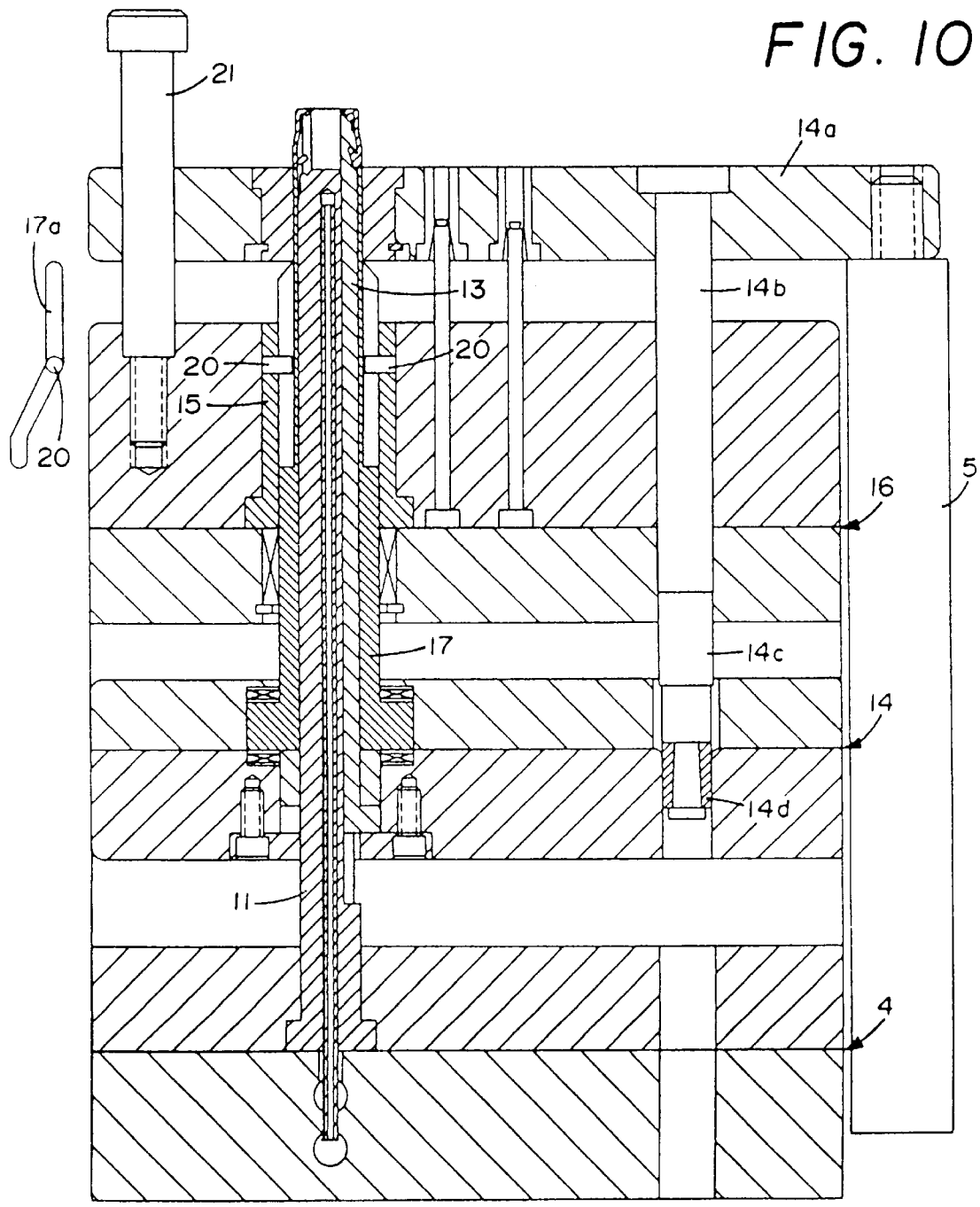
FIGS. 10, 11, and 12 are sectional, side elevational views illustrating the operation of the molding machine when molding the cap shown in FIG. 3.
Figure 11:
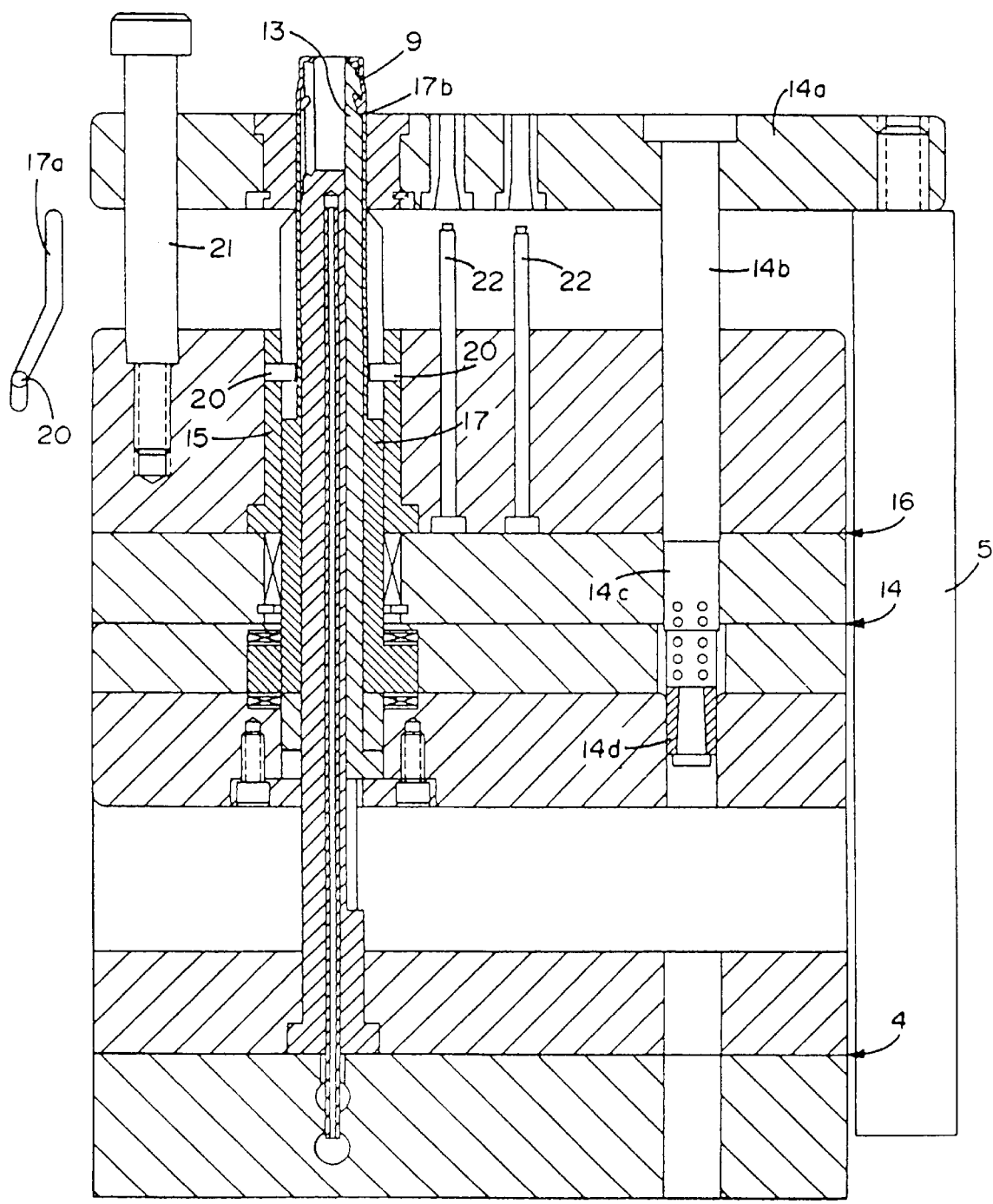
Figure 12:
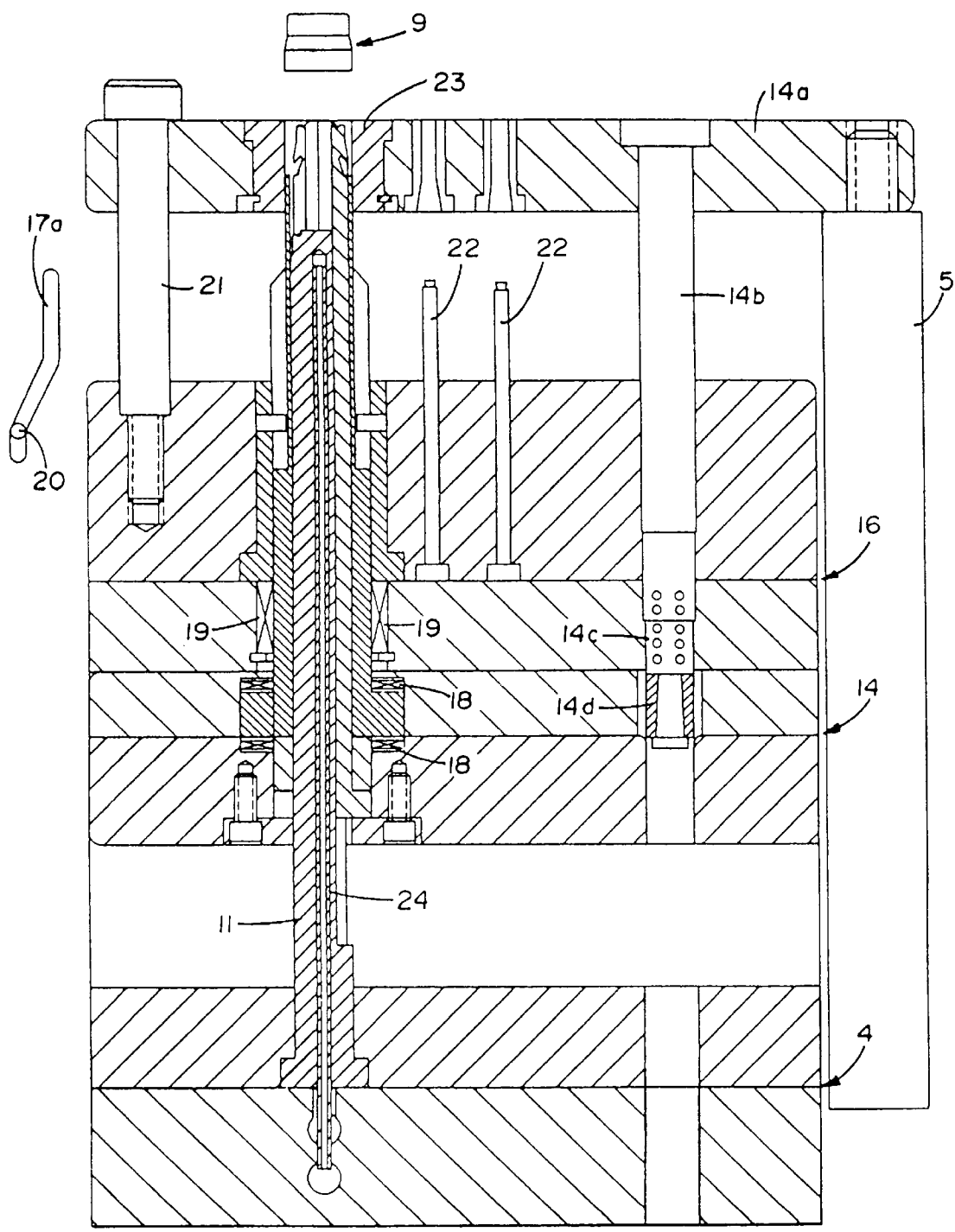

The upward movement of movable plate assembly 14 is accomplished by the hydraulic cylinders 5 connected at their upper ends to a movable plate 14a having a depending rod 14b extending downwardly through the fixed plate assembly 16 and slidably mounted therein. The lower end of the rod 14b is provided with a spring tensioned telescopic portion 14c, and a friction sleeve 14a mounted in the movable plate assembly 14. As the hydraulic cylinders 5 are extended, as shown in FIG. 10, the movable plate 14a is pushed upwardly away from the top surface of the fixed plate assembly 16. The rod 14b, carried by the movable plate 14a, pulls the movable plate assembly 14 upwardly until the movable plate assembly 14 engages the bottom surface of the fixed plate assembly 16 as shown in FIG. 11. Continued upward movement of the movable plate 14a, as shown in FIG. 12, is accommodated by the extension of the telescopic portion 14c of the rod 14b.

To complete the structure of the molding apparatus, suitable guide rods 21, 22 extend between the fixed plate assembly 16 and the movable plate 14a, having a stripper 23 mounted therein, and a coolant tube 24 is fixed at its lower end to the fixed platen assembly and extends upwardly into the core 11.

In the operation of the molding apparatus of the present invention, the components of the injection molding machine are initially in the closed position as shown in FIG. 9, wherein plastic is injected through the spine 2, gate 2a, and into the cup-shaped cavity of the female mold 12, wherein the configurations of the upper end portions of the core 11 and blades 13, together with the cup-shaped cavity, form the cap 9. After the plastic has set, the movable platen 3 is raised, as shown in FIG. 10, and the hydraulic cylinders 5 are extended to raise the movable plate 14a away from the top surface of the fixed plate assembly 16 while simultaneously moving the movable plate assembly 14 upwardly toward the bottom surface of the fixed plate assembly 16. Since the blades 13 and ratchet sleeve 17 are mounted on the movable plate assembly 14, they too slide upwardly relative to the core 11 which is mounted on the fixed platen 4. The ratchet sleeve 17 also slides upwardly relative to the linear drive member 15. During this upward movement, the pins 20 on the linear drive member 15 slide in the slots 17a of the ratchet sleeve 17. Since the first portion of the slot 17a is axial, as shown schematically in FIG. 10, there is no rotation of the ratchet sleeve 17. Continued upward movement of the movable plate assembly 14 and movable plate 14a, as shown in FIG. 11, will result in the linear drive member pins 20 sliding in the offset portions of the slots 17a causing the ratchet sleeve 17 to rotate substantially 60°. Since the teeth 17b on the end of the ratchet sleeve 17 are connected to the lower peripheral edge of the cap 9, the cap is rotated relative to the blades 13 so that the cap tabs 9d and ribs 9e are moved clear of the blade recesses 13a, 13b. The cap 9 is now in position for removal from the molding apparatus which is shown in FIG. 12, wherein continued upward movement of the movable plate 14a causes the stripper 23 to engage the lower edge portion of the cap skirt to thereby push the cap 9 out of engagement with the ratchet sleeve teeth 17b.

It is to be understood that the form of the invention herewith shown and described is to be taken as a preferred example of the same, and that various changes in the shape, size, and arrangement of parts may be resorted to, without departing from, the spirit of the invention or scope of the subjoined claims.

We claim:

1. Apparatus for molding a plastic cap, having a top wall and a depending skirt having a plurality of inwardly and upwardly extending ribs integral with the lower edge of the skirt and a plurality of radially inwardly extending ribs integral with the inner wall surface of a skirt, comprising a fixed platen assembly, a core secured to said fixed platen assembly, a movable platen assembly spaced from said fixed platen assembly, a female mold having a cup-shaped cavity mounted in said movable platen assembly, said cup-shaped cavity being connected to a supply of flowable plastic material, a movable plate assembly and a fixed plate assembly positioned between the fixed and movable platens, said core extending through the movable and fixed plate assemblies into the cup-shaped cavity of said female mold, a plurality of longitudinally extending blades slidably mounted on the outer surface of said core, a first end of each said blades being secured to said movable plate assembly, a second end of each of said blades extending into the female mold, recesses provided in the second end of each of said blades, said recesses having configurations corresponding to the inclined tabs and radially inwardly extending ribs on the cap, said core and blades being spaced inwardly from the wall of said cavity to provide a gap for receiving the flow of plastic material therein to form the cap, a drive member secured to said fixed plate assembly, a rotatable driven member mounted on said movable plate assembly, said rotatable driven member being operatively connected to said drive member, said driven member having an end portion engaging the lower peripheral edge of the molded cap skirt in the female mold, means for moving the movable plate assembly relative to the fixed plate assembly, whereby the drive member on the fixed plate assembly causes the driven member on the movable plate assembly to rotate, to thereby rotate the molded cap relative to the second end of each of said blades for moving the cap tabs and ribs away from the blade recesses prior to stripping the finished cap from the apparatus, said drive member comprising a cylindrical linear drive member and said driven member comprising a ratchet sleeve mounted coaxially within the cylindrical drive member and slidably mounted on said core and blades, at least one axially extending offset slot provided in the side wall of said ratchet sleeve, and at least one pin fixedly mounted into said linear drive member and extending radially therefrom into said slot, whereby upon movement of the movable plate assembly, the pin in the slot causes the ratchet sleeve to rotate.

2. Apparatus for molding a plastic cap, having a top wall and a depending skirt having a plurality of inwardly and upwardly extending ribs integral with the lower edge of the skirt and a plurality of radially inwardly extending ribs integral with the inner wall surface of a skirt, comprising a fixed platen assembly, a core secured to said fixed platen assembly, a movable platen assembly spaced from said fixed platen assembly, a female mold having a cup-shaped cavity mounted in said movable platen assembly, said cup-shaped cavity being connected to a supply of flowable plastic material, a movable plate assembly and a fixed plate assembly positioned between the fixed and movable platens, said core extending through the movable and fixed plate assemblies into the cup-shaped cavity of said female mold, a plurality of longitudinally extending blades slidably mounted on the outer surface of said core, a first end of each said blades being secured to said movable plate assembly, a second end of each of said blades extending into the female mold, recesses provided in the second end of each of said blades, said recesses having configurations corresponding to the inclined tabs and radially inwardly extending ribs on the cap, said core and blades being spaced inwardly from the wall of said cavity to provide a gap for receiving the flow of plastic material therein to form the cap, a drive member secured to said fixed plate assembly, a rotatable driven member mounted on said movable plate assembly, said rotatable driven member being operatively connected to said drive member, said driven member having an end portion engaging the lower peripheral edge of the molded cap skirt in the female mold, means for moving the movable plate assembly relative to the fixed plate assembly, whereby the drive member on the fixed plate assembly causes the driven member on the movable plate assembly to rotate, to thereby rotate the molded cap relative to the second end of each of said blades for moving the cap tabs and ribs away from the blade recesses prior to stripping the finished cap from the apparatus, said drive member comprising a cylindrical linear drive member and said driven member comprising a ratchet sleeve mounted coaxially within the cylindrical drive member and slidably mounted on said core and blades, at least one axially extending offset slot provided in the side wall of said ratchet sleeve, and at least one pin fixedly mounted into said linear drive member and extending radially therefrom into said slot, whereby upon movement of the movable plate assembly, the pin in the slot causes the ratchet sleeve to rotate and a plurality of circumferentially spaced teeth on the end portion of the ratchet sleeve, said teeth engaging the lower peripheral edge of the molded cap skirt.

3. Apparatus for molding a plastic cap, having a top wall and a depending skirt having a plurality of inwardly and upwardly extending ribs integral with the lower edge of the skirt and a plurality of radially inwardly extending ribs integral with the inner wall surface of a skirt, comprising a fixed platen assembly, a core secured to said fixed platen assembly, a movable platen assembly spaced from said fixed platen assembly and comprising first and second plate members positioned on opposite sides of said fixed plate assembly, and means for moving the movable plate assembly relative to the fixed plate assembly including at least one hydraulic cylinder connected to the first plate member on one side of said fixed plate assembly, a depending rod connected to said first plate member and extending through said fixed plate assembly, the end of the rod being connected to the second plate member, whereby upon extension of the hydraulic cylinder the first plate member is moved away from one side of the fixed plate assembly and the second plate member is pulled by said rod toward the opposite side of said fixed plate assembly, a female mold having a cup-shaped cavity mounted in said movable platen assembly, said cup-shaped cavity being connected to a supply of flowable plastic material, a movable plate assembly and a fixed plate assembly positioned between the fixed and movable platens, said core extending through the movable and fixed plate assemblies into the cup-shaped cavity of said female mold, a plurality of longitudinally extending blades slidably mounted on the outer surface of said core, a first end of each said blades being secured to said movable plate assembly, a second end of each of said blades extending into the female mold, recesses provided in the second end of each of said blades, said recesses having configurations corresponding to the inclined tabs and radially inwardly extending ribs on the cap, said core and blades being spaced inwardly from the wall of said cavity to provide a gap for receiving the flow of plastic material therein to form the cap, a drive member secured to said fixed plate assembly, a rotatable driven member mounted on said movable plate assembly, said rotatable driven member being operatively connected to said drive member, said driven member having an end portion engaging the lower peripheral edge of the molded cap skirt in the female mold, means for moving the movable plate assembly relative to the fixed plate assembly, whereby the drive member on the fixed plate assembly causes the driven member on the movable plate assembly to rotate, to thereby rotate the molded cap relative to the second end of each of said blades for moving the cap tabs and ribs away from the blade recesses prior to stripping the finished cap from the apparatus, said drive member comprising a cylindrical linear drive member and said driven member comprising a ratchet sleeve mounted coaxially within the cylindrical drive member and slidably mounted on said core and blades, at least one axially extending offset slot provided in the side wall of said ratchet sleeve, and at least one pin fixedly mounted into said linear drive member and extending radially therefrom into said slot, whereby upon movement of the movable plate assembly, the pin in the slot causes the ratchet sleeve to rotate, and a plurality of circumferentially spaced teeth on the end portion of the ratchet sleeve, said teeth engaging the lower peripheral edge of the molded cap skirt.

4. Apparatus for molding a plastic cap, having a top wall and a depending skirt having a plurality of inwardly and upwardly extending ribs integral with the lower edge of the skirt and a plurality of radially inwardly extending ribs integral with the inner wall surface of a skirt, comprising a fixed platen assembly, a core secured to said fixed platen assembly, a movable platen assembly spaced from said fixed platen assembly and comprising first and second plate members positioned on opposite sides of said fixed plate assembly, and means for moving the movable plate assembly relative to the fixed plate assembly including at least one hydraulic cylinder connected to the first plate member on one side of said fixed plate assembly, a depending rod connected to said first plate member and extending through said fixed plate assembly, the end of the rod being connected to the second plate member, whereby upon extension of the hydraulic cylinder the first plate member is moved away from one side of the fixed plate assembly and the second plate member is pulled by said rod toward the opposite side of said fixed plate assembly, a female mold having a cup-shaped cavity mounted in said movable platen assembly, said cup-shaped cavity being connected to a supply of flowable plastic material, a movable plate assembly and a fixed plate assembly positioned between the fixed and movable platens, said core extending through the movable and fixed plate assemblies into the cup-shaped cavity of said female mold, a plurality of longitudinally extending blades slidably mounted on the outer surface of said core, a first end of each said blades being secured to said movable plate assembly, a second end of each of said blades extending into the female mold, recesses provided in the second end of each of said blades, said recesses having configurations corresponding to the inclined tabs and radially inwardly extending ribs on the cap, said core and blades being spaced inwardly from the wall of said cavity to provide a gap for receiving the flow of plastic material therein to form the cap, a drive member secured to said fixed plate assembly, a rotatable driven member mounted on said movable plate assembly, said rotatable driven member being operatively connected to said drive member, said driven member having an end portion engaging the lower peripheral edge of the molded cap skirt in the female mold, means for moving the movable plate assembly relative to the fixed plate assembly, whereby the drive member on the fixed plate assembly causes the driven member on the movable plate assembly to rotate, to thereby rotate the molded cap relative to the second end of each of said blades for moving the cap tabs and ribs away from the blade recesses prior to stripping the finished cap from the apparatus, said drive member comprising a cylindrical linear drive member and said driven member comprising a ratchet sleeve mounted coaxially within the cylindrical drive member and slidably mounted on said core and blades, at least one axially extending offset slot provided in the side wall of said ratchet sleeve, and at least one pin fixedly mounted into said linear drive member and extending radially therefrom into said slot, whereby upon movement of the movable plate assembly, the pin in the slot causes the ratchet sleeve to rotate, and a plurality of circumferentially spaced teeth on the end portion of the ratchet sleeve, said teeth engaging the lower peripheral edge of the molded cap skirt, the end of the rod connected to the second plate member having a spring tensioned telescopic portion, whereby when the second plate member abuts said opposite side of the fixed plate assembly, the telescopic portion extends thereby allowing the first plate member to be moved further from the said one side of said fixed plate assembly.

5. Apparatus for molding a plastic cap, having a top wall and a depending skirt having a plurality of inwardly and upwardly extending ribs integral with the lower edge of the skirt and a plurality of radially inwardly extending ribs integral with the inner wall surface of a skirt, comprising a fixed platen assembly, a core secured to said fixed platen assembly, a movable platen assembly spaced from said fixed platen assembly and comprising first and second plate members positioned on opposite sides of said fixed plate assembly, and means for moving the movable plate assembly relative to the fixed plate assembly including at least one hydraulic cylinder connected to the first plate member on one side of said fixed plate assembly, a depending rod connected to said first plate member and extending through said fixed plate assembly, the end of the rod being connected to the second plate member, whereby upon extension of the hydraulic cylinder the first plate member is moved away from one side of the fixed plate assembly and the second plate member is pulled by said rod toward the opposite side of said fixed plate assembly, a female mold having a cup-shaped cavity mounted in said movable platen assembly, said cup-shaped cavity being connected to a supply of flowable plastic material, a movable plate assembly and a fixed plate assembly positioned between the fixed and movable platens, said core extending through the movable and fixed plate assemblies into the cup-shaped cavity of said female mold, a plurality of longitudinally extending blades slidably mounted on the outer surface of said core, a first end of each said blades being secured to said movable plate assembly, a second end of each of said blades extending into the female mold, recesses provided in the second end of each of said blades, said recesses having configurations corresponding to the inclined tabs and radially inwardly extending ribs on the cap, said core and blades being spaced inwardly from the wall of said cavity to provide a gap for receiving the flow of plastic material therein to form the cap, a drive member secured to said fixed plate assembly, a rotatable driven member mounted on said movable plate assembly, said rotatable driven member being operatively connected to said drive member, said driven member having an end portion engaging the lower peripheral edge of the molded cap skirt in the female mold, means for moving the movable plate assembly relative to the fixed plate assembly, whereby the drive member on the fixed plate assembly causes the driven member on the movable plate assembly to rotate, to thereby rotate the molded cap relative to the second end of each of said blades for moving the cap tabs and ribs away from the blade recesses prior to stripping the finished cap from the apparatus, said drive member comprising a cylindrical linear drive member and said driven member comprising a ratchet sleeve mounted coaxially within the cylindrical drive member and slidably mounted on said core and blades, at least one axially extending offset slot provided in the side wall of said ratchet sleeve, and at least one pin fixedly mounted into said linear drive member and extending radially therefrom into said slot, whereby upon movement of the movable plate assembly, the pin in the slot causes the ratchet sleeve to rotate, and a plurality of circumferentially spaced teeth on the end portion of the ratchet sleeve, said teeth engaging the lower peripheral edge of the molded cap skirt, the end of the rod connected to the second plate member having a spring tensioned telescopic portion, whereby when the second plate member abuts said opposite side of the fixed plate assembly, the telescopic portion extends thereby allowing the first plate member to be moved further from the said one side of said fixed plate assembly, a stripper mounted in said first plate member, whereby the stripper removes the finished cap from the second end of each of said blades during said further movement of said first plate member.

\* \* \* \* \*